United States Patent
Engh-Halstvedt et al.

(10) Patent No.: US 9,779,536 B2
(45) Date of Patent: Oct. 3, 2017

(54) GRAPHICS PROCESSING (71) Applicant: ARM Limited, Cambridge (GB)

(72) Inventors: Andreas Engh-Halstvedt, Trondheim (NO); Daren Croxford, Cambridge (GB); Frank Langtind, Tiller (NO)

(73) Assignee: Arm Limited, Cambridge (GB)

( * ) Notice: Subject to any disclaimer, the term of this patent is extended or adjusted under 35 U.S.C. 154(b) by 109 days.

(21) Appl. No.: 14/790,452

(22) Filed: Jul. 2, 2015

(65) Prior Publication Data

US 2016/0005140 A1 Jan. 7, 2016

(30) Foreign Application Priority Data

Jul. 3, 2014 (GB) .................... 1411892.1

(51) Int. Cl.
*G06T 15/50* (2011.01)
*G06T 15/00* (2011.01)
(52) U.S. Cl.
CPC .................. *G06T 15/005* (2013.01)
(58) Field of Classification Search
CPC ............ G06T 15/80; G06T 1/20; G06T 15/40
See application file for complete search history.

(56) References Cited

U.S. PATENT DOCUMENTS

2010/0302246 A1 12/2010 Jiao
2012/0223947 A1\* 9/2012 Nystad .................. G06T 15/005
345/426

OTHER PUBLICATIONS

UK Search Report dated Jan. 9, 2015, UK Patent Application GB1411892.1.

\* cited by examiner

*Primary Examiner* — Hau Nguyen
(74) *Attorney, Agent, or Firm* — Vierra Magen Marcus LLP (57) ABSTRACT

A graphics processing pipeline (20) comprises first vertex shading circuitry (21) that operates to vertex shade position attributes of vertices of a set of vertices to be processed by the graphics processing pipeline. Tiling circuitry (22) then determines for the vertices that have been subjected to the first vertex shading operation, whether the vertices should be processed further. A second vertex shading circuitry (23) then performs a second vertex shading operation on the vertices that it has been determined should be processed further, to vertex shade the remaining vertex attributes for each vertex that it has been determined should be processed further.

18 Claims, 3 Drawing Sheets

GRAPHICS PROCESSING

BACKGROUND

The technology described herein relates to graphics processing, and in particular to the operation of graphics processing pipelines that include a vertex shading stage.

As is known in the art, graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is usually defined by and represented as a set of vertices. Each vertex for a primitive typically has associated with it a set of "attributes", i.e. a set of data values for the vertex. These attributes will typically include position data and other, non-position data (varyings), e.g. defining colour, light, normal, texture coordinates, etc., for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rasterising and rendering the primitives to generate the graphics processing output.

The rasterising and rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rasterised and rendered. This "vertex shading" operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in.

A graphics processing pipeline will typically therefore include a vertex shading stage (a vertex shader) that executes vertex shading computations on the initial vertex attribute values defined for the vertices so as to generate a desired set of output vertex attributes (i.e. appropriately "shaded" attributes) for use in subsequent processing stages of the graphics processing pipeline.

The vertex shader is typically a programmable processing stage of the graphics processing pipeline that executes vertex shader programs ("vertex shaders") on input vertex attribute values to generate a desired set of output "vertex shaded" attributes data (e.g. appropriately transformed vertex position data) for processing by the rest of the graphics processing pipeline. The vertex shader may share programmable processing circuitry with other "shaders" of the graphics processing pipeline, or it may be a distinct programmable processing unit.

The vertex shader is thus a processing unit that performs graphics processing by running small programs for each vertex (and for each vertex attribute) in a graphics output (render target) to be generated (such as a frame). Typically an execution thread will be issued for each vertex (and/or vertex attribute) to be processed, and the thread will then execute the instructions in the shader program to produce the desired vertex shaded output attributes data.

Once the vertex attributes have been shaded, the "shaded" attributes are then used when processing the vertices (and the primitives to which they relate) in the remainder of the graphics processing pipeline.

(In general "input variables" and "output variables" are the generic terms used for inputs and outputs from shaders (shading stages) in graphics processing pipelines. Before being vertex shaded, a vertex is a collection of "generic vertex attributes" that can be accessed within the vertex shader as input variables. The vertex shader execution then produces a vertex position and any outputs explicitly written by the vertex shader. "Varyings" are the attributes communicated from the vertex shader to rasterisation and fragment shading, not including position. (Thus only the non-position outputs from the vertex shader are "varyings".))

Figure 1:
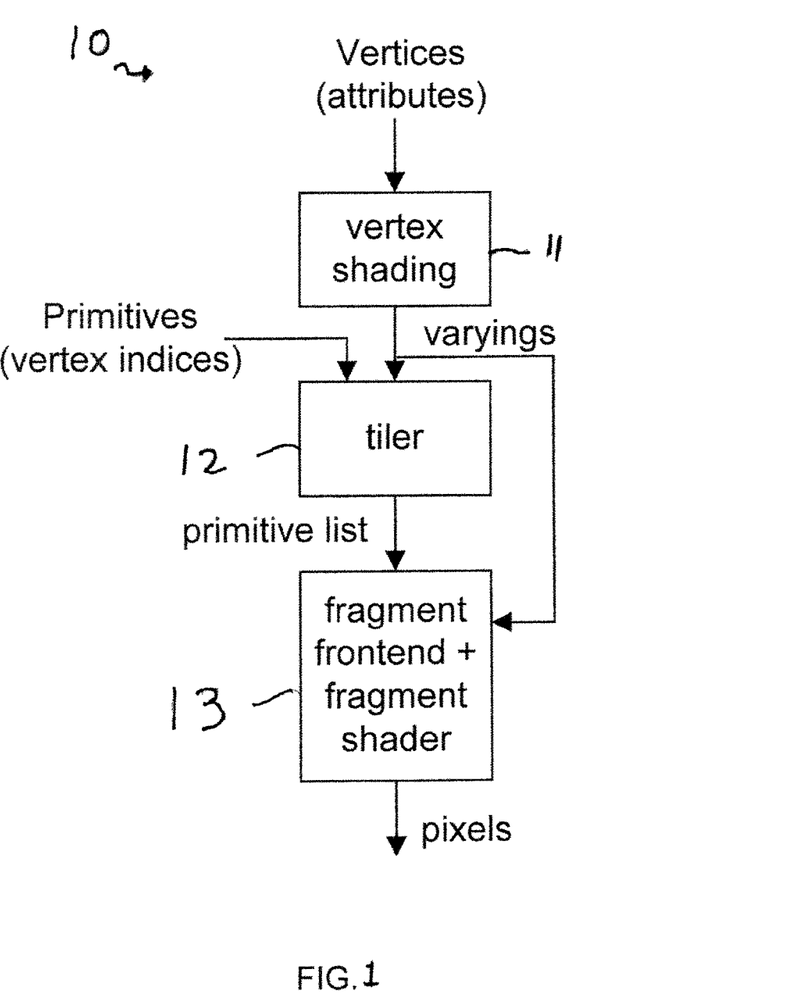
FIG. 1 illustrates schematically an exemplary graphics processing pipeline.

FIG. 1 shows schematically the above operation in the case of an exemplary tile based graphics processing pipeline 10.

(As the graphics processing pipeline shown in FIG. 1 is a tile based rendering pipeline, the two-dimensional render output or target (i.e. the output of the rendering process, such as an output frame to be displayed) is rendered as a plurality of smaller area sub-regions, usually referred to as "tiles". The tiles are each rendered separately (typically one after another). The rendered tiles are then combined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.)

FIG. 1 shows some but not all of the stages and components of the overall graphics processing pipeline, namely the stages that are relevant to the operation of the technology described herein. FIG. 1 thus shows a vertex shading stage 11, a tiler 12 and a fragment frontend and fragment shader stage 13 of the graphics processing pipeline 10.

The vertex shading stage 11 receives incoming vertices (attributes data) and performs vertex shading operations on the vertex attributes, such as transforming the attributes of the vertices using a transformation function.

The vertex-shaded attributes, together with a list of primitives that make up the, e.g. draw call being processed, are then passed to a tiler 12 that sorts the primitives into respective primitive lists (tile lists) for the tiles that the graphics processing output (render target) has been divided into, to indicate the primitives to be processed for each tile.

The primitive lists, together with the vertex shaded attributes, are then fed to the fragment frontend and fragment shader stage 13. The fragment frontend and fragment shader stage 13 performs the rasterising and rendering processes.

To do this it includes a fixed hardware element that performs fragment "front-end" operations including primitive (e.g. triangle) setup and rasterisation. The rasterisation process, as is known in the art, rasterises the primitives to generate "fragments" on which the further graphics processing operations, including rendering, are to be carried out. (The "fragments" are the graphical entities that pass through the rendering process (the rendering pipeline).)

The fragments produced by the rasteriser are rendered in the fragment shader of the fragment frontend and fragment shader stage 13. The rendering process uses the fragment positions (derived from the shaded vertex position attributes) together with the shaded vertex varyings (non-position vertex attributes) to derive data, such as red, green and blue (RGB) colour values and an "Alpha" (transparency) value, necessary to represent the primitives at the sampling positions of the render target (i.e. the fragment shader "shades" the sample positions of the render target).

The rendered fragment data (sampling position data) is written to a tile buffer and, subsequently, written out as pixel data to a frame buffer, e.g. for display (this may include backend fragment operations, such as downsampling, to determine the final pixel colours to be stored in the frame buffer).

The Applicants believe that there remains scope for improvements for graphics processing pipelines that include a vertex shading stage.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

A first embodiment of the technology described herein comprises a method of operating a graphics processing pipeline that includes a vertex shading stage that performs vertex shading operations on vertex attribute data to generate vertex-shaded vertex attribute data, the method comprising:

for a set of vertices to be processed by the graphic processing pipeline:

(i) performing a first vertex shading operation on one or more vertices of the set of vertices, wherein the first vertex shading operation comprises performing, for the one or more vertices of the set, vertex shading processing for at least one but not all of the vertex attributes of the vertex or vertices in question, to generate vertex shaded attribute data for those attributes of the vertex or vertices;

(ii) determining, for a vertex or vertices that have been subjected to the first vertex shading operation, whether the vertex or vertices in question should be processed further, using, at least in part, some or all of the vertex shaded attribute data generated by the first vertex shading operation; and (iii) performing a second vertex shading operation on a vertex or vertices that it has been determined should be processed further, wherein the second vertex shading operation comprises performing vertex shading processing for at least one other vertex attribute of the plurality of vertex attributes belonging to the vertex in question, to generate vertex shaded attribute data for the at least one other attribute of the vertex or vertices.

A second embodiment of the technology described herein comprises a graphics processing pipeline comprising:

(i) a first vertex shading stage that performs a first vertex shading operation on one or more vertices of a set of vertices to be processed by the graphics processing pipeline, wherein the first vertex shading operation comprises performing, for the one or more vertices of the set, vertex shading processing for at least one but not all of the vertex attributes of the vertex or vertices in question, to generate vertex shaded attribute data for those attributes of the vertex or vertices;

(ii) a determining stage that determines, for a vertex or vertices that have been subjected to the first vertex shading operation, whether the vertex or vertices in question should be processed further, using, at least in part, some or all of the vertex shaded attribute data generated by the first vertex shading operation; and (iii) a second vertex shading stage that performs a second vertex shading operation on a vertex or vertices that it has been determined should be processed further, wherein the second vertex shading operation comprises performing vertex shading processing for at least one other vertex attribute of the plurality of vertex attributes belonging to the vertex in question, to generate vertex shaded attribute data for the at least one other attribute of the vertex or vertices.

In the technology described herein, unlike in conventional vertex shading arrangements, the vertex shading operation is divided into two parts (the technology described herein uses a "two-pass" vertex shading arrangement), a first vertex shading operation that generates vertex shaded data for some but not all of the vertex attributes, and a second vertex shading operation that generates vertex shaded data for vertex attributes that were not processed in the first vertex shading operation. Between the first and second vertex shading operations, vertex shaded data from the first vertex shading operation is used, at least in part, to determine if the vertices should be processed further (e.g. are required for generating the output), and those vertices that have been determined to be processed further are then subjected to the second vertex shading operation.

The Applicants have recognised that in many cases not all the vertices defined for an, e.g. draw call, will in fact be used to generate the desired graphics output, e.g. frame for display. This may occur, e.g., when one or more vertices lie outside of the view frustum or when one or more vertices belong (solely) to back facing primitives. The Applicants have further recognised that any vertex shading computations performed for such "unused" vertices are ultimately redundant.

The technology described herein addresses this by providing a system that can avoid redundant vertex shading computations. This is achieved, as mentioned above, by splitting the vertex shading into two stages, and conditionally executing the second stage for the vertices that it is determined should be processed further (e.g. that are determined to be required to generate the graphics processing output). In this way, only a reduced set of vertex shading operations can be performed for vertices that it can be determined will in fact be "unused".

It is anticipated that as many as 50% of the vertices may not be used to generate the final graphics processing output, e.g. frame to be displayed. The technology described herein can thus provide a significant reduction in the amount of vertex shading computations performed by the graphics processing system, thereby reducing memory bandwidth, computation load and power consumption (e.g. compared to arrangements in which all the vertices defined, e.g. for a draw call, are fully vertex-shaded before any further graphics processing is performed).

The set of vertices that is being processed in the arrangements of the technology described herein can be any desired and suitable set of vertices to be processed by the graphics processing pipeline. Thus the set of vertices may comprise (and in one embodiment does comprise) the entire set of vertices defined for a given graphics processing output (render target), such as for a frame to be displayed. It may also comprise a set of vertices that is defined for less than the entire render output, such as a set of vertices defined for a given draw call. In an embodiment, the set of vertices is a set of vertices defined for a draw call.

(Where the set of vertices is less than the entire set of vertices defined for a given render output, then in an embodiment the operation in the manner of the technology described herein is repeated for each set of vertices (e.g., and in an embodiment, each draw call) of the render output. Correspondingly, the process of the technology described herein is in an embodiment repeated for plural, and in an embodiment for each, render output to be generated, e.g. for successive frames in a sequence of output frames.)

The first vertex shading operation that processes (vertex shades) one or more vertices of the set of vertices may process only some but not all of the vertices of the set of vertices, but in an embodiment processes all of the vertices of the set of vertices being processed (i.e. each vertex in the set of vertices being processed is subjected to the first vertex shading operation).

As discussed above, the first vertex shading operation is in an embodiment implemented by means of a vertex shader core executing an appropriate vertex shader (vertex shading program) for the vertices. Each vertex to be processed is in an embodiment represented as an execution thread, which threads execute the appropriate vertex shading program to carry out the first vertex shading operation. In an embodiment there is one execution thread per vertex to be processed.

Thus the first vertex shading operation is in an embodiment implemented using execution threads that execute a sequence of program instructions that effect the first vertex shading operation.

The vertex shader (vertex shading program) that the vertex execution threads execute for the first vertex shading operation can be configured in any desired and suitable manner. It in an embodiment comprises a limited (e.g. lightweight) version of the vertex shader that has been defined for the graphics processing output (e.g. draw call) in question. Thus, it in an embodiment comprises only part but not all of the vertex shader that has been defined for the graphics processing output (e.g. draw call) in question.

The configuration of the vertex shader (vertex shading program) for the first vertex shading operation can be achieved in any suitable and desired manner. In an embodiment, the vertex shader (vertex shading program) supplied by the application that requires the graphics processing (i.e. that has been defined for the graphics processing output in question) is modified to remove (delete) the attributes that are not to be processed by the first vertex shading operation and then recompiled. In an embodiment, the operation to do this comprises parsing the complete vertex shader (vertex shading program) supplied by the application that requires the graphics processing (i.e. that has been defined for the graphics processing output in question), and then creating two copies of the parsed shader program, and in one copy of the parsed shader program deleting all output attributes except the position output and, in an embodiment, performing dead code elimination to remove all code that does not contribute to the position output, and then in the other copy deleting the position output and optimising the shader program. The first copy of the shader program where all output attributes except the position output have been deleted is then used for the first vertex shading operation, with the second copy for which conversely the position output has been removed then being used for the second vertex shading operation. This then straightforwardly gives the shader code that is needed for the two vertex shading operations of the technology described herein. This may be done by any suitable element of the overall graphics processing system, such as, and in an embodiment, the compiler for the vertex shader.

Other arrangements for deriving the vertex shaders (the vertex shading programs) for the first and second vertex shading operations would, of course, be possible.

The first vertex shading operation performs vertex shading for at least one but not all of the vertex attributes of the vertices (i.e. for some but not all of the vertex attributes).

The at least one vertex attribute that is processed in the first vertex shading operation can be any one or more desired and suitable vertex attribute. There may be only one attribute that is processed, or there may be plural attributes that are processed.

In an embodiment, the attribute(s) that is processed in the first shading operation is dependent on the criteria to be used to determine whether a vertex should be processed further.

In an embodiment, the vertex attributes that are processed in the first vertex shading operation comprise one or more position attributes of the vertices. Usually there will only be a single position attribute, consisting of (X, Y, Z, W) components. In this case, the vertex attributes that are processed in the first vertex shading operation will comprise (at least) that single position attribute. However, there may also be other position attributes, such as a point size or a line width (e.g. when rendering points and lines). Also, in the case of stereoscopic rendering, there could be two positions output, one being the vertex position as seen from the left eye and the other being the vertex position as seen from the right eye. In this case, there would typically be one position input, but two separate transforms (in the first vertex shading operation) on that one position input, thereby producing two position outputs.

In an embodiment all the position attributes are vertex shaded in the first vertex shading operation, but less than all, such as only one of the position attributes could be processed, if desired. In one embodiment, only position attributes are processed in the first vertex shading operation (and thus in an embodiment no varyings are processed in the first vertex shading operation), but it would also be possible to process one or more other (non-position) attributes as well as one or more position attributes, if desired.

The Applicants have recognised in this regard that the position of a vertex can be used to determine if it should be processed further, and, moreover, that in such cases, the only vertex shaded attributes required to determine if a vertex should be processed further is the vertex shaded position data.

Accordingly, in embodiments of the technology described herein, the first vertex shading operation comprises performing vertex shading computations on the position attributes (position data) of the vertices being processed. Thus, the first vertex shading operation in an embodiment transforms at least, and in an embodiment only, the position attributes of the vertices being processed.

The vertex shaded attribute data that is generated by the first vertex shading operation can comprise any desired and suitable such data, and will, e.g., depend upon the vertex attributes that the first vertex shading operation processes. As discussed above, the vertex shaded data generated by the first vertex shading operation in an embodiment comprises (at least) vertex shaded position data (e.g. the transformed geometry) for the vertices. The vertex shaded data may also comprise vertex shaded data for one or more of the non-position vertex attributes.

The vertex shaded attribute data that is generated by the first vertex shading operation should be, and is in an embodiment, stored appropriately for subsequent use by the graphics processing pipeline. It is in an embodiment stored in the normal manner for vertex shaded attributes in the graphics processing pipeline (system) in question. (There will also be original, i.e. un-vertex shaded, vertex data (attributes) at this stage.)

It is then determined for one or more of the vertices that have been subjected to the first vertex shading operation whether that vertex or vertices should be processed further. This is in an embodiment done once the first vertex shading operation has been completed for all the vertices in question (once all the vertices to be subjected to the first vertex shading operation have been processed).

In an embodiment this determination is done for all the vertices that have been subjected to the first vertex shading operation (although this is not essential, and if desired only some but not all of the vertices that have been subjected to the first vertex shading operation could be subjected to this determination). It would also be possible to subject further vertices that have not been subjected to the first vertex shading operation (if any) to this determination, if desired.

The determination of whether a vertex should be processed further following the first vertex shading operation can be performed in any desired and suitable manner and using any desired and suitable test to determine if the vertex should be processed further. In an embodiment, this process determines whether the vertex could be required for generating the output of the graphics processing operation (i.e. whether the vertex could be needed to contribute to the output of the graphics processing operation). The determination is in an embodiment carried out in an appropriately conservative manner, so as to only discard from further processing any vertices that it can be determined with sufficient certainty will not be required for generating the output of the graphics processing operation.

In an embodiment, this determination comprises determining whether the vertex belongs to (is to be used for) a primitive that could be visible in the output of the graphics processing operation (and if it is determined that the vertex does not belong to (is not used for) any primitives that could be visible in the output of the graphics processing operation, then the vertex is determined as not needing to be processed further (and so, in an embodiment, is not subjected to the second vertex shading operation).

In an embodiment, the determination comprises at least one of, and in an embodiment both of: determining whether the vertex belongs to a primitive that lies at least partially within the view frustrum for the output being generated; and whether the vertex belongs to a forward facing primitive. Then, if the vertex is determined to belong to a forward facing primitive that lies at least partially within the view frustrum, it is determined as needing to be processed further (and subjected to the second vertex shading operation), but any vertex that solely belongs to primitives that lie entirely outside the view frustrum or that are backward facing, is determined as not needing to be processed further (and so, in an embodiment, is not subjected to the second vertex shading operation (and is not processed further)).

The determination of whether a vertex should be processed further uses, as discussed above, at least in part, vertex shaded data from the first vertex shading operation. As discussed above, this vertex shaded data will depend upon the nature of the determination, but in an embodiment comprises vertex shaded position data (attributes) for the vertices in question (as it is the position data for the vertices (and for the primitives that they form) that is needed, for example, to determine whether vertices and primitives lie within the view frustrum or not).

The determination of whether a vertex should be processed further following the first vertex shading operation can be performed by any desired suitable stage and element of the graphics processing pipeline. For example, a specific test stage for performing this determination could be included in the graphics processing pipeline.

However, in an embodiment, the determination is performed by an existing stage of the graphics processing pipeline, in an embodiment by a stage that would otherwise normally perform as part of its "normal" processing operations a test or tests that can be used for the determination.

In an embodiment, the graphics processing pipeline is a tile based graphics processing pipeline, and the tiler (the tiling stage) of the graphics processing pipeline performs the determination of whether the vertices should be processed further (and thus will be subjected to the second vertex shading operation or not). Thus, in an embodiment, the determination stage is a tiler of the graphics processing pipeline.

Typically, the tiler will determine (from the vertex shaded position attributes for the vertices) which primitives are potentially visible in the render target being generated, and thus should be processed further. For example, the tiling process will normally test whether primitives are (at least partially) within the view frustum and are therefore required for further processing. The tiler will also typically include a backward facing culling test.

Thus, the tiler is a suitable stage of the graphics processing pipeline for performing the determination, as the tiler already operates to perform "visibility" tests (such as view frustum and/or back facing tests and so on) on primitives of the scene to be displayed.

Thus, if a primitive is included in a tile list by the tiler (the tiling process), that can be taken as an indication that (and a determination that) the primitive (and thus its vertices) should be processed further (and vice-versa).

Thus, in an embodiment, a vertex will be deemed as needing to be processed further if it is determined to belong to a potentially visible primitive at the tiling stage, i.e. if a primitive that it belongs to (that it is to be used for) is included in a tile list at the tiling stage.

Correspondingly, in an embodiment, the determining of whether a vertex should be processed further comprises determining whether the vertex belongs to (is to be used for) a primitive that has been included in a tile list for the graphics processing operation being performed.

Thus, in embodiments of the technology described herein, the tiler operates in the normal manner (e.g. to receive primitive lists comprising the vertex indices making up a draw call, and to perform the necessary visibility tests for sorting (potentially) visible primitives into tile lists), but instead of generating a full set of vertex shaded attributes before the tiling operation (as is conventional in the art), only the vertex shaded position data is generated before the tiling operation. (It will be appreciated that the vertex shaded position data is the only vertex shaded attributes required for correct operation of the tiler.)

Correspondingly, in embodiments of the technology described herein, the first vertex shading operation is performed at a stage of the graphics processing system which is before tiling, and the second vertex shading operation is performed after tiling (but before rasterising, for example) and is only performed for the vertices that have been determined, at the tiling stage, as potentially being required for generating the graphics processing output, in an embodiment based on the vertex shaded data generated by the first vertex shading operation.

The tiler (and determination stage, if not the tiler) can use any suitable and desired methods to determine which vertices should be processed further, such as tests on the vertices (or on the primitives to which the vertices belong) based on bounding boxes, back facing determinations, or any other suitable tests that can, e.g. be performed in a tiler (at the tiling stage).

The vertices that it is determined should be processed further are then subjected to a second vertex shading operation that vertex shades further attributes of the vertices. Thus the result of the determination of whether the vertices should be processed further is used to conditionally execute the second vertex shading operation. In an embodiment only those vertices that it is determined should be processed further are then subjected to a second vertex shading operation (or at least to the full second vertex shading operation) (i.e. any vertices that it is determined do not need to be processed further are then not subjected to the second vertex shading operation (are not subjected to the "full" second vertex shading operation).

The second vertex shading operation is in an embodiment performed for all the vertices (for each of the vertices) in the set of vertices being processed for which it is determined that the vertex should be processed further, but if desired (and appropriate) the second vertex shading operation need not be performed for all (e.g. is performed for some but not all) of the vertices in question. It could also, if desired, be performed for other vertices that were not subjected to the determination of whether they should be processed further (if any), if desired.

The second vertex shading operation operates to "vertex shade" at least one other attribute of the vertices that it has been determined should be processed further. In an embodiment, the second vertex shading operation vertex shades all the remaining attributes of the vertices in question. It may also vertex shade the attributes that were processed by the first vertex shading operation, but that is not preferred (as vertex shaded versions of those attributes will have already been derived by the first vertex shading operation).

The second vertex shading operation in an embodiment operates to vertex shade the varyings (i.e. non-position attributes) for the vertices, such as one or more of, and in an embodiment all of: colour, texture coordinates, normals, etc.

The partitioning of the vertex attributes between the first and second vertex shading operations can be selected as desired, e.g. based on the relative processing requirements of the attributes.

As discussed above, the second vertex shading operation is in an embodiment implemented using execution threads representing the vertices that execute the appropriate vertex shading program (vertex shader). In an embodiment there is one execution thread for each vertex to be processed.

The vertex shader (vertex shading program) that the vertices execute for the second vertex shading operation may comprise the full version of the vertex shader that has been defined for the graphics processing output (e.g. draw call) in question. However, in an embodiment it comprises a modified version of the "full" vertex shader, for example, and in an embodiment, which takes account of the fact that some of the vertex shading (for some of the attributes) has already been performed in the first vertex shading operation. In this case the configuration of the vertex shader (vertex shading program) for the second vertex shading operation can be achieved in any suitable and desired manner. In an embodiment, the vertex shader (vertex shading program) supplied by the application that requires the graphics processing (i.e. that has been defined for the graphics processing output in question) is modified to remove (delete) the attributes that are not to be processed by the second vertex shading operation and then recompiled.

As will be discussed below, in some embodiments, the vertex shader that is executed for the second vertex shading operation also includes an instruction that facilitates discarding (i.e. not processing) vertices that it has been determined do not need to be processed further (will not be required for generating the graphics processing output).

The first and second vertex shading operations (vertex shading stages) could be implemented in separate vertex shading execution cores of the graphics processing pipeline. However, in an embodiment they are performed as respective, different, passes in the same vertex shading execution core.

The second vertex shading operation can be triggered and performed for the vertices that are required to be processed further in any suitable and desirable manner.

In one embodiment, the graphics processing pipeline is configured to perform the second vertex shading operation for the vertices that are required to be processed further "on demand", e.g., and in an embodiment, as and when it is determined that a vertex (or a group of vertices) should be processed further when it is being determined whether the vertices should be processed further.

In this case, when it is determined that a vertex should be processed further, an execution thread for the vertex (or execution threads for the vertices) is in an embodiment created (issued) at that point to trigger the execution of the second vertex shading operation for the vertex (or vertices) in question. Thus, in an embodiment, the tiler requests (and triggers) the second vertex shading for a vertex, e.g., and in an embodiment by issuing an execution thread for the vertex, as and when (and in an embodiment immediately) it includes a primitive that the vertex belongs to in a tile list.

In this case, the system could, e.g., be, and is in an embodiment, configured to keep track of those vertices that have been subjected to the second vertex shading operation, to avoid processing the same vertex twice (e.g. where the vertex is used for multiple primitives).

In another embodiment, the second vertex shading operation is performed after it has been determined for some or all (and in an embodiment for all) of the vertices (in question) whether they should be processed further (rather than "on demand").

In this case, the second vertex shading operation stage is in an embodiment comprised with an indication of which vertices it is to process (i.e. which vertices it has been determined should be processed further). (This is so that the vertex shading execution core can identify which vertices to process in the second vertex shading operation.)

This is achieved, in an embodiment, by (e.g. and in an embodiment, the determination stage, in an embodiment the tiler) generating and storing in memory information indicating which vertices have been determined as to be processed further, which information is in an embodiment then used by the second vertex shading operation to determine the vertices to be processed.

The information indicating the vertices to be processed by the second vertex shading operation can take any desired and suitable form. In an embodiment this information is in the form of a "vertex" bitmap with each entry (bit) in the vertex bitmap indicating whether a vertex (or a group of vertices) should be processed further (and should therefore be subjected to the second vertex shading operation). For example, each entry in the vertex bitmap can have a value of "0" or "1", which will indicate whether or not the vertex (or group of vertices) associated with the entry in question has been determined as needing to be processed further.

In one embodiment, the vertex bitmap has a single bit for each individual vertex (of the set of vertices, e.g. making up the draw call, being considered). In this case, each bit in the vertex bitmap will correspond to a different vertex.

In other embodiments, a bit (and in an embodiment each bit) in the vertex bitmap corresponds to a group of vertices. For example, the bitmap may be configured such that at least one (and in an embodiment each) bit of the vertex bitmap corresponds to a group of, e.g. 4 or 16, vertices. This arrangement will accordingly comprise a more compact vertex bitmap that will use less memory than arrangements where each bit corresponds to a single vertex.

In an embodiment, the resolution of the vertex bitmap can be varied in use, e.g. between using a single bit for each individual vertex or each bitmap entry representing a group of plural vertices. This may be useful to, e.g., dynamically vary the size (and thus memory requirements) of the vertex bitmap in use.

Although the vertex bitmap only requires a single bit per vertex (or group of vertices) to indicate whether or not the vertex (or group of vertices) has been determined as needing to be processed, the vertex bitmap may be organised per byte (i.e. store each "logical flag" of the bitmap as a byte instead of as a bit), if desired. This will increase the storage requirements, but simplify access to the "bitmap". (It will, for example, reduce the need for an array access pattern such as read-modify-write operations (which can increase the latency of the memory accesses), thereby increasing the efficiency of the system.) In an embodiment write strobes are used to write the vertex bitmap temporal data, so that no read-modify-write operations are needed.

The vertex bitmap may be generated in software or hardware, as appropriate. It is in an embodiment generated by the stage of the graphics processing pipeline that performs the determination of whether a vertex should be processed further. Thus, in an embodiment, the tiler (the tiling stage) generates the vertex bitmap. The stage, e.g. tiler, that generates the vertex bitmap is in an embodiment configured to be able to write to any location in the vertex bitmap.

The vertex bitmap is in an embodiment generated as the vertices (or the primitives to which they relate) are tested to determine whether the vertices should be processed further. Thus, for example, and in an embodiment, when it is determined that a vertex or primitive should be processed further (e.g. is to be used for a primitive that is at least partially within the view frustum and forward facing), the corresponding entry in the vertex bitmap is in an embodiment set to indicate that the vertex should be processed further.

The vertex bitmap can be stored as desired. It is in an embodiment stored as a vertex bitmap buffer in memory that is accessible to the graphics processing pipeline.

In an embodiment, the vertex processing information, e.g. vertex bitmap, is initialised, e.g., by a host processor, by graphics processing unit (GPU) control, GPU software or a DMA set, such that each entry, e.g. in the vertex bitmap buffer, is set to an initial value, such as "0", that indicates that the vertex (or group of vertices) in question should not be processed further, and then whenever a vertex (or group of vertices) is determined as needing to be processed further (e.g. where the tiler determines that the vertex is (potentially) visible), the, e.g. vertex bitmap, entry corresponding to that vertex (or group of vertices) is set to a value, such as "1", indicating that the vertex should be processed further (and thus subjected to the second vertex shading operation). This saves the, e.g., tiler from having to perform writes to the, e.g. vertex bitmap, when a primitive (and its vertices) are not to be processed further.

(Conversely, each entry could be initialized with a value indicating that the vertex or vertices should be processed further, and whenever it is determined that a vertex (or group of vertices) will not be required, the entry is set to indicate that the vertex or vertices should not be processed further.)

The Applicants have recognised that it would be preferable to "tune" the way in which data for the, e.g. vertex bitmap, is organised and/or written to memory based on the memory access scheme being used by the graphics processing pipeline.

Thus, in an embodiment of the technology described herein, the vertex processing information, e.g. vertex bitmap, is organised in memory based on the order that the graphics processing (e.g. the execution units) will process (e.g. iterate through) the vertices in question (which is not necessarily in primitive order).

This can be achieved by, for example, and in an embodiment, storing the vertex entries in memory based on the vertex identifiers (indices) used to identify the vertices in the set of vertices (e.g. for the draw call). That is, each entry in the, e.g. vertex bitmap, may be stored in a memory location that is mapped (to correspond) with the vertex index for the vertex in question of the set. In this way, the index value of a vertex in the set of vertices (e.g. draw call) can be used as an identifier of the location in memory at which the corresponding entry in the, e.g. vertex bitmap, is stored.

The Applicants have also recognised that many of the access patterns that could be used to access the vertex processing information, e.g. vertex bitmap, may be irregular and therefore time consuming (i.e. have a high latency). In order to reduce this latency, in an embodiment the vertex processing data is written to memory using (i.e. via) write merge buffers. Thus, in an embodiment, a plurality of writes to memory for the vertex processing entries (e.g. having consecutive destination memory addresses) are combined in a local memory buffer (e.g. a cache memory) before the combined buffer is written to the, e.g. vertex bitmap buffer (e.g. in main memory) (from the local memory), in a single write operation.

This saves on the number of separate write operations to the main vertex processing data in memory, thereby reducing the latency of the write operations. It also has the advantage that the vertex processing data entries will be stored in consecutive destination addresses in memory, which can improve the latency of subsequent read/write operations to the memory locations at which the entries are stored.

In these arrangements, the cache lines are in an embodiment tagged based on part of the identifier for the vertex (or vertices) to which the cache line in question relates.

The information, e.g. vertex bitmap, indicating the vertices that should be processed further can be used in any desired and suitable way to control the conditional execution of the second vertex shading operation for the vertices that are to be processed further.

In an embodiment, the second vertex shading operation checks the stored data indicating whether a vertex should be processed further or not (e.g. checks the vertex bitmap) to determine whether or not to perform the second vertex shading operation for the vertex in question.

As discussed above, the second vertex shading operation will be performed by creating (and executing) execution threads for the vertices that are to undergo the second vertex shading operation.

In one embodiment, the information, e.g. vertex bitmap, indicating whether a vertex should be processed further is checked as and when execution threads to be executed for the second vertex shading operation are being created, to determine whether to issue an execution thread for the second vertex shading operation for the vertex in question. In this case therefore, execution threads for the second vertex shading operation are in an embodiment only generated and issued if it is indicated that the vertex in question should be processed further.

Thus, in an embodiment, the vertex shading execution core checks the information, e.g. the vertex bitmap, indicating whether the vertices should be processed or not before each thread (for executing the second vertex shading operation) is created, and if the value that is stored corresponding to the vertex (or vertices) in question indicates that the vertex (or vertices) is not to be processed further, a thread for that vertex (or vertices) is not generated, but if the value that is stored for the vertex or vertices in question indicates that the vertex or vertices should be processed further, a thread (or threads) is generated, and executed, for the vertex or vertices in question.

The check operation that is performed before each thread (for the second vertex shading operation) is created in these embodiments may be implemented in any desired and suitable manner. However, the Applicants have recognised that performing a memory access operation (such as the check operation) each time a thread is to be created may involve a significant amount of memory access timing overhead.

Thus, in an embodiment, the information for many consecutive vertex (e.g. bitmap) entries (corresponding to a number of vertices) is accessed in a burst-like fashion. That is, instead of performing multiple memory accesses of the, e.g. vertex bitmap buffer, e.g. once for each vertex, a single memory access operation to determine vertex information for multiple entries (vertices) at the same time is performed. (This information is then used to generate (or not) threads for the vertices to which the information relates.)

To facilitate this operation, the, e.g. vertex bitmap entries, are in an embodiment stored in the order that the vertex threads will be (intended to be) created.

In an embodiment, the read bursts are performed in advance to reduce memory latency.

In another embodiment, threads for execution are created (and issued) for the second vertex shading operation for all the vertices in the set, irrespective of whether the vertices have been determined as needing to be processed further or not, but each thread then uses the vertex processing information to determine whether the thread should be "fully" executed or not (i.e. should execute the second vertex shading operation or not).

In this arrangement, each execution thread is in an embodiment configured to determine at the start of its execution sequence, whether the vertex to which it relates should be processed further (should be subjected to the second vertex shading operation or not), with the thread then being configured to execute the second vertex shading operation, in dependence upon the determination.

To facilitate this, in these arrangements, the instruction sequence to be executed by each thread for the second vertex shading operation in an embodiment includes an, in an embodiment initial, or at least early, instruction, in an embodiment in the shader program preamble, to access the information indicating whether the vertex should be processed further (e.g. the vertex bitmap buffer) for the vertex in question, and to determine therefrom whether to perform the second vertex shading operation for the thread (vertex) in question or not.

In this case, the remaining instructions (e.g. for the remaining vertex shading computations) for a thread are then in an embodiment conditionally executed based on the value that is (determined to be) stored in the, e.g. vertex bitmap entry, corresponding to the thread (vertex) in question.

For example, if the information (value) that is stored for the vertex indicates that the vertex should not be processed further, the thread is in an embodiment killed at that point (such that it does not execute the remaining vertex shader instructions for that vertex), but if the information (value) that is stored for the vertex indicates that the vertex should be processed further, the thread executes the remaining instructions, so as to perform the second vertex shading operation for that vertex.

It will be appreciated here that although in this arrangement threads for each vertex will be generated (even if some of the vertices (and thus threads) will not be required), this arrangement can still (significantly) reduce the processing load on the system by not having to execute the entire vertex shader (beyond the check operation) for some threads.

Once the second vertex shading operation has been performed for the vertices that it has been determined should be processed further, then the complete vertex shaded attributes data for the vertices (i.e. the vertex shader data from the first and second vertex shading operations), together with, e.g., the primitive lists generated by the tiler, can be passed to (and used by) the remaining stages of the graphics processing pipeline to generate the desired output (render target) of the graphics processing pipeline.

As is known in the art, this processing can include, inter alia, primitive (e.g. triangle) setup, rasterisation and rendering. These processes can be performed in any desired and suitable manner, e.g. depending upon the nature of the graphics processing pipeline in question. The final output of the graphics processing operation can then, e.g., be written, e.g. to a frame buffer, in main memory, from where it can then, e.g., be provided to a display for display, or otherwise processed.

The process may then be repeated for the next render output (e.g. the next frame to be displayed, and so on). (The technology described herein is in an embodiment implemented for a sequence of frames to be displayed, and in an embodiment for each frame in a sequence of frames to be displayed, for example.)

Although the technology described herein could be used whenever the graphics processing pipeline is generating a desired render output, the Applicants have recognised that there may be circumstances where it may not be so desirable to implement the operation in the manner of the technology described herein.

Thus, in an embodiment, the operation in the manner of the technology described herein can be selectively used (enabled) for respective render outputs, e.g. on an output frame-by-frame basis.

(When the vertex shading in the manner of the technology described herein is disabled, the graphics processing pipeline in an embodiment operates to "fully" vertex shade the vertices in a single vertex shading operation (i.e. in which vertex shading computations are performed for all of the vertex attributes in a single initial vertex shading operation).)

Thus, in an embodiment, the method of the technology described herein further comprises determining (and the graphics processing pipeline is further configured to determine) whether or not to enable the vertex shading operation of the technology described herein.

This may be done, e.g., for each new set of vertices to be processed, each time a new draw call is to be rendered, each time a new frame is to be rendered, etc., or it may be done more intermittently, and/or repeated periodically, e.g. after a given, in an embodiment selected, in an embodiment predetermined, number of draw calls and/or frames have been processed.

The determination of whether to enable (or not) the vertex shading operation of the technology described herein can be based on any suitable and desired criteria. In an embodiment, it is based on one or more of, and in an embodiment both of: information relating to previous graphics outputs (e.g. frames) that have been processed; and information relating to the graphics output (e.g. frame) currently being processed.

The information pertaining to the previous output (e.g. previous frame or frames) and the current output (e.g. frame) can be any suitable and desired such information, e.g. that can be used to assess whether it would be beneficial to perform the vertex shading operation in the manner of the technology described herein.

In an embodiment, the information pertaining to the previous output (frame or frames) is information indicative of the performance of the system in its current operating mode.

In an embodiment, the information pertaining to the previous output (e.g. the previous output frame or frames) comprises data indicating one or more of: the number of visible (and/or non-visible) primitives in a previous output (frame or frames), and the number of back facing primitives that were culled in a previous output (frame or frames).

The Applicants have recognised in this regard that the number of visible (and/or non-visible) primitives in a previous frame or frames can be used to determine the likely benefits of enabling the vertex shading mode of operation of the technology described herein. For example, if the number of visible primitives in the previous frame was low (e.g. below a certain threshold value), then it could be more desirable for the graphics processing system to operate in the manner of the technology described herein, and vice-versa.

The information, such as the number of visible (and/or non-visible) primitives, etc., can be determined as desired, for example by using appropriate performance counters (that are, e.g., incremented, e.g. by the tiler, whenever a visible (or non-visible) primitive is identified).

The information pertaining to the current output (frame) that is used to determine whether or not to enable the vertex shading operation in the manner of the technology described herein can correspondingly take any suitable and desired form.

In an embodiment, this information comprises one or more of, and in an embodiment all of: the complexity of the vertex shader (the vertex shading program) that is to be executed; the number of vertex attributes that are to be vertex shaded; the amount of data that is to be written out by the vertex shading process; the ratio of vertices to primitives in the output (e.g. draw call) being processed; the number of vertices and/or primitives for the output (e.g. draw call); and information indicating the amount of varying data (the number of non-position vertex attributes) for each vertex.

In one embodiment, the information pertaining to the current frame comprises information based on static information included in the draw call in question.

Again, the Applicants have recognised that such information can give an indication of the amount and complexity of the work that the vertex shader will be required to do, and an indication of how much data will need to be transmitted throughout the system, and its implications on bandwidth requirements.

Thus, in an embodiment, vertex shading in the manner of the technology described herein is enabled where one or more given performance criteria, such as the number of visible and/or non-visible primitives in a previous frame or frames, are above (or below) a given, in an embodiment selected, in an embodiment predetermined, threshold.

It will be appreciated from the above that in embodiments of the technology described herein at least, the graphics processing pipeline is configured to perform a more limited, partial vertex shading operation prior to tiling the primitives to be processed, and then subjects only those vertices that are associated with primitives that the tiler has included in tile lists to the remainder of the vertex shading processing. In other words, at least some of the vertex shading processing is deferred until after the tiling stage.

Thus, Another embodiment of the technology described herein comprises a method of operating a tile-based graphics processing pipeline that includes a plurality of processing stages including a vertex shading stage that performs vertex shading operations on vertex attribute data to generate vertex shaded vertex attribute data, and a tiling stage that sorts primitives to be processed by the graphics processing pipeline into primitive lists for respective tiles that the render target output of the graphics processing pipeline has been divided into for rendering purposes, the method comprising:

when generating a render target to be generated by the graphics processing pipeline:

deferring the vertex shading of at least some of the attributes of the vertices to be processed when generating the render target until after the tiling stage of the graphics processing pipeline has prepared the primitive lists for the tiles that the render target of the graphics processing pipeline has been divided into for rendering purposes.

Another embodiment of the technology described herein comprises a tile-based graphics processing pipeline comprising:

a plurality of processing stages including a vertex shading stage that performs vertex shading operations on vertex attribute data to generate vertex shaded vertex attribute data, and a tiling stage that sorts primitives to be processed by the graphics processing pipeline into primitive lists for respective tiles that the render output of the graphics processing pipeline has been divided into for rendering purposes;

wherein the pipeline is configured to, when generating a render output to be generated by the graphics processing pipeline that requires vertex shading operations:

defer the vertex shading of at least some of the attributes of the vertices to be processed when generating the render output until after the tiling stage of the graphics processing pipeline has prepared the primitive lists for the tiles that the render output has been divided into for rendering purposes.

As will be appreciated by those skilled in the art, these embodiments of the technology described herein can, and in an embodiment do, include any one or more or all of the optional features of the technology described herein described herein, as appropriate.

Thus, for example, vertex shading of some (but not all) of the vertex attributes (and in an embodiment for the position attributes only) is in an embodiment performed before the tiling stage prepares the tile lists. Correspondingly, the deferred vertex shading is in an embodiment only performed for those vertices that belong to (that are to be used for) primitives that have been included in a primitive list by the tiling stage.

The above describes the elements of the graphics processing pipeline that are involved in the operation in the manner of the technology described herein. As will be appreciated by those skilled in the art, the graphics processing pipeline can otherwise include, and in an embodiment does include, any one or one or more, and in an embodiment all, of the other processing stages that graphics processing pipelines normally include. Thus, for example, the graphics processing pipeline in an embodiment also includes a primitive setup stage, a rasteriser and a renderer. In an embodiment the renderer is in the form of or includes a programmable fragment shader.

The graphics processing pipeline may also contain any other suitable and desired processing stages that a graphics processing pipeline may contain such as a depth (or depth and stencil) tester, a blender, etc.

In an embodiment, the graphics processing pipeline comprises, and/or is in communication with, one or more memories and/or memory devices that store the data described herein, and/or that store software for performing the processes described herein. The graphics processing pipeline may also be in communication with the host microprocessor, and/or with a display for displaying images based on the output of the graphics processing pipeline.

The render output to be generated may comprise any render output that is to be generated by the graphics processing pipeline. Thus it may comprise, for example, a tile to be generated in a tile based graphics processing system, and/or a frame of output fragment data. The technology described herein can be used for all forms of output that a graphics processing pipeline may be used to generate, such as frames for display, render-to-texture outputs, etc. In an embodiment, the render output is an output frame.

The technology described herein may be carried out by any kind of graphics processing system. However, in an embodiment, the graphics processing pipeline and system is a tile-based (tiling) graphics processing pipeline and system. In this case, the pipeline in an embodiment also comprises a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described technology described herein technology described herein As discussed above, the technology described herein relates to a system and method in which, in embodiments, the vertex shading operation is divided into two stages; a first, partial vertex shading stage which operates to process (i.e. shade) position (and optionally one or more varyings) data for the vertices included in a draw call; and a second partial vertex shader operation which operates to conditionally process (i.e. shade) the remaining varyings data for each vertex included in the draw call, where the condition for processing (shading) the remaining varyings data for the vertex in question is whether the vertex has been determined as needing to be processed further using, at least in part, the vertex shaded data from the first vertex shading operation.

Figure 2:
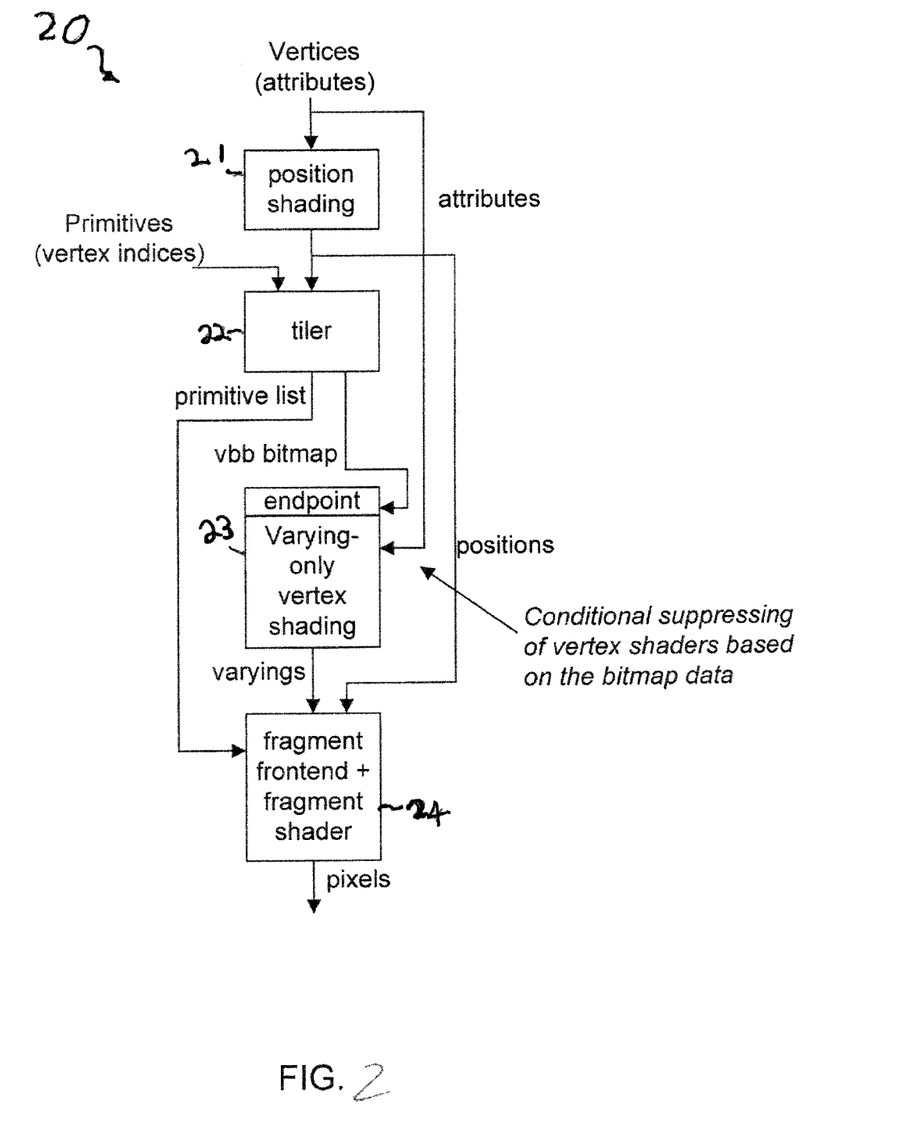
FIG. 2 shows schematically a graphics processing pipeline of an embodiment of the technology described herein.

FIG. 2 schematically illustrates a tile-based graphics processing pipeline 20 An embodiment of the technology described herein.

As shown in FIG. 2, the graphics processing pipeline 20 comprises a position shading stage 21, a tiler 22, a varying-only vertex shading stage 23 and a fragment frontend and fragment shader stage 24.

The position shading stage 21 is a vertex shading stage of the graphics processing pipeline 20 that is configured to perform a first, partial, vertex shading operation to vertex shade the positional attributes only of the vertices being processed.

As can be seen in FIG. 2, the position shading stage 21 is operable to receive vertices (that is, the data values associated with the original attributes for the vertices) from the application that requires the graphics processing. The position shading stage 21 will then perform vertex shading computations on the positional attributes of those vertices (e.g. by means of some transformation function) to generate partial vertex shaded data (that is, partially transformed vertices where only the positions have been transformed).

The partial vertex shaded data, together with a list of the primitives to be processed (which is indicated in terms of the respective indices of the vertices making up each primitive), is then fed to the tiler 22 of the graphics processing pipeline 20.

The tiler 22 uses these two inputs to identify which primitives should be processed for each tile that the render output has been divided into, and prepares a respective primitive list (tile list) for each tile, indicating the primitives that should be processed for that tile. The tiler 22 can sort the primitives into tiles using any desired and suitable technique for that process. (It will be appreciated here that the only vertex shaded data required for the tiler to generate the primitive list(s) is the vertex shaded position data.)

As part of its operation, the tiler 22 will, as is known in the art, identify primitives that should be processed further to generate the render output. This may include, for example, performing view frustum and back-face culling tests on the primitives.

In the present embodiment, the tiler also operates to determine vertices that should be processed further to generate the render output. The tiler 22 does this by assuming that each vertex that belongs to a primitive that has been included in a primitive list (i.e. that is accordingly to be processed further) should be processed further.

As part of this operation, the tiler 22 generate a vertex bitmap buffer (vbb bitmap), indicating the vertices that it has identified as needing to be processed further. In the present embodiment, each entry (bit) in the vertex bitmap corresponds to a single vertex. Thus, when the tiler includes a primitive in a primitive list for a tile, it sets the corresponding bits in the vertex bitmap for the vertices that are to be used for the primitive (e.g. to "1") to indicate that those vertices should be processed further.

Once the tiler 22 has completed the primitive list and the vertex bitmap, the vertex bitmap buffer (vbb bitmap) and the initial list of vertices (attributes) are provided to the varying only vertex shading stage 23 of the graphics processing pipeline.

The varying only vertex shading stage 23 performs vertex shading computations on the remaining varying data (attributes) of the vertices that the vertex bitmap buffer indicates should be processed further (and stores the vertex-shaded varying data in memory, from where it can be accessed by later stages of the graphics processing pipeline 20). Thus, the varying only vertex shading stage 23 of the graphics processing pipeline 20 performs a second partial vertex shading operation, but only on those vertices that the vertex bitmap buffer indicates as needing to be processed further.

It will be appreciated that any vertices that have been subjected to the second partial vertex shading operation at the varying only vertex shading stage 23 will now have a complete set of vertex shaded attributes (e.g. the vertex shaded position data generated at the position shading stage 21, and the vertex shaded varying data generated at the varying only vertex shading stage 23).

This vertex shaded data can then be used, together with the tile primitive lists (generated by the tiler 22), to generate the desired output of the graphics processing pipeline, such as a frame for display.

Thus, as shown in FIG. 2, the vertex shaded positions and varyings data and the primitive lists are passed to the fragment frontend and fragment shader stage 24 of the graphics processing pipeline 20 for subsequent processing.

The fragment frontend and fragment shader stage 24 performs appropriate front-end, rendering (fragment shading), and fragment back-end, processing operations, as is known in the art.

The front end operations include primitive (triangle) setup and rasterisation of the primitives.

The rasteriser will, as is known in the art, receive primitives to be rasterised, test those primitives against sampling point positions, and generate graphics fragments to be rendered representing the primitives accordingly. Each fragment generated by the rasteriser may represent (have associated with it) a single sampling point, or plural sampling points, as desired. In an embodiment, each fragment represents a set of plural, in an embodiment four (2×2), sampling points.

The renderer then processes the fragments generated by the rasteriser to generate rendered fragment data (such as red, green and blue (RGB) colour values and an "Alpha" (transparency) value) for (covered) sampling points that the fragments represent, as is known in the art. These rendering processes may include, for example, fragment shading, blending, texture-mapping, etc. In the present embodiment, the renderer is, as shown in FIG. 2, in the form of a programmable fragment shader.

The rendered fragment data (sampling position data) is then written to a tile buffer and, subsequently, written out as pixel data to a frame buffer, e.g. for display (not shown) (this may include backend fragment operations, such as downsampling, to determine the final pixel colours to be stored in the frame buffer).

Figure 3:
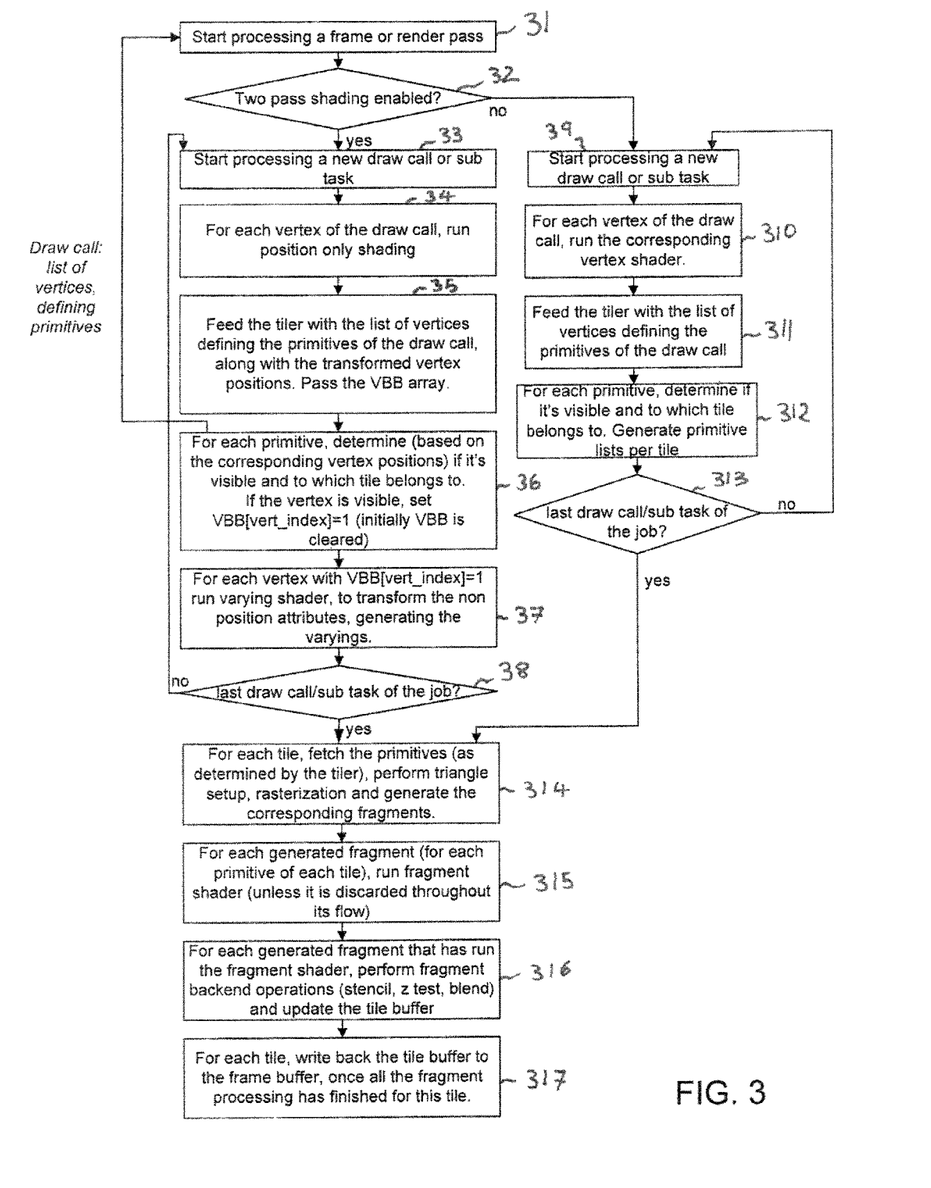
FIG. 3 is a flowchart illustrating the operation of a graphics processing pipeline in an embodiment of the technology described herein.

FIG. 3 shows in more detail the operation of a graphics processing pipeline An embodiment of the technology described herein. In particular, FIG. 3 is a flow chart illustrating the operational steps executed by a graphics processing pipeline when set to operate an embodiment of the technology described herein.

FIG. 3 shows the processing steps for processing a given output frame or render pass, and so as shown in FIG. 3, the process starts when a new frame or render pass is to be processed (step 31).

The graphics processing operation first checks, at step 32, whether or not the two-pass vertex shading operation in the manner of the technology described herein is enabled.

If it is determined at step 32 that two-pass vertex shading is enabled, the operation proceeds to step 33 in order to start processing a draw call (or sub-task) of the frame or render pass in a manner according to the embodiments of the technology described herein.

At step 34, position only vertex shading is performed for each vertex of the draw call to generate partial vertex shaded vertices for the vertices.

The tiler is then fed with the partial vertex shaded vertices (comprising the vertex shaded position data) and a list of vertices defining the primitives of the draw call (step 35). A vertex bitmap buffer array, which has been pre-initialised with zeros (where a zero indicates that a vertex should not be processed further), is also passed into the tiler.

At step 36, the tiler determines, for each primitive, if the primitive is (potentially) visible (e.g. if the primitive is within the view frustum and is forward facing), and, if so, which tile or tiles it at least partially falls within, and generates a primitive list for each tile. The tiler uses the partial vertex shaded data (particularly the transformed position data), and the lists of indices for the primitives making up the draw call, to do this.

If the tiler determines that a primitive is visible, it also updates the vertex bitmap array entries for each vertex of the primitive to "1", to indicate that those vertices should be processed further.

After the tiler has finished its operation, each vertex whose entry in the vertex bitmap buffer is set to "1" (i.e. is indicated as needing to be processed further) is subjected to a further vertex shading operation to transform the non-position attributes of the vertex (step 37). In this way, the graphics processing pipeline conditionally executes the vertex shader for the remaining attributes (the varyings) of the vertices based on the information stored in the vertex bitmap buffer for each vertex. The transformed varyings data is then stored in memory.

Steps 33 to 37 are repeated for each draw call/sub-task of the frame (or render pass), until all the visible primitives and their vertices have been fully shaded and sorted into primitive lists (step 38).

Once it is determined at step 38 that the current draw call/sub task is the last one of the graphics processing job (frame or render pass), then the operation proceeds to step 314, as will be described below.

After completing steps 33 to 38, the graphics processing pipeline will have performed full vertex shading computations (and derived a full set of vertex shaded attributes) for only the vertices that are determined by the tiling process to belong to (potentially) visible primitives. This can significantly reduce the number of ultimately redundant vertex shading computations compared to graphics processing pipelines that simply perform the full vertex shading operation for all the vertices (and for all the vertex attributes) in advance of the tiling process.

Where it is determined at step 32 that two-pass vertex shading in the manner of the technology described herein is disabled, the graphics processing pipeline operates in the conventional manner. Thus, as shown in FIG. 3, when processing a new draw call or sub task (step 39), the full vertex shader is run for each vertex making up the draw call (i.e. the "full" vertex shading operation, on all attributes of the vertices, is executed) (step 310).

The shaded vertices and a list of vertices (vertex indices) making up the draw call are then passed to the tiler (step 311) and the tiler then determines, for each primitive of the draw call, if the primitive in question is visible and to which tile or tiles it belongs (step 312), and generates a primitive list per tile (to indicate the primitives to be processed for each tile).

At step 313, it is checked whether or not the current draw call/sub task (for which steps 39-312 have been executed) is the last draw call/sub task of the graphics processing job. If the current draw call/sub task is not the last draw call/sub task of the graphics processing job, then the operation returns and executes steps 39 to 312 for the next draw call/sub task. If, however, it is determined at step 313 that the current draw call/sub task is the last one of the graphics processing job, then the operation proceeds to step 314.

Steps 314 and 317 are performed for each tile of the render output. The tiles may be processed one after another, or tiles may be processed in parallel, depending on the capabilities of the graphics processing pipeline.

At step 314, the primitives for the tile (as determined by the tiler) are fetched, and front-end operations such as triangle setup and rasterisation for each primitive for the tile are performed, to generate the corresponding fragments for rendering the primitives.

Each generated fragment (for each primitive of the tile) is then subjected to a fragment shading operation (unless a fragment is discarded during its processing) to generate rendered fragment data for the fragment (step 315).

The fragments that complete the fragment shading process are then subjected, at step 316, to backend fragment operations, such as stencil and depth tests, and blending operations. The resulting data generated for each tile sampling position (e.g. the final colour values etc. that will be used to represent the sampling positions of the tiles) is then stored in a tile buffer located in on-chip memory, for example.

At step 317, once the fragment processing has finished for a tile, the data stored in the tile buffer (which by this point includes all the necessary data to represent the entire tile) is written to the frame buffer in order to be displayed.

It can be seen from the above that the technology described herein, in its embodiments at least, comprises a system that, inter alia, generates a full set of vertex shaded attributes (required for generating a frame for display, for example) only for vertices that it is determined will be required to generate the output, e.g. frame for display.

This is achieved in the embodiments of the technology described herein at least, by dividing the vertex shading operation into two stages (two passes), a first stage (pass) that performs vertex shading computations on some but not all of attributes of the vertices, and then a second stage (pass) that performs vertex shading computations on other attributes of the vertices, but only for vertices that it has been determined should be processed further.

Such a system is advantageous in that it minimises redundant vertex shading computations, such as those that are performed on vertices that will not be visible in the scene to be rendered for display, thereby improving the overall performance of the graphics processing system.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline that includes vertex shading circuitry that performs vertex shading operations on vertex attribute data to generate vertex-shaded vertex attribute data, the method comprising:
for a set of vertices to be processed by the graphic processing pipeline:
(i) performing a first vertex shading operation on one or more vertices of the set of vertices, wherein the first vertex shading operation comprises performing, for the one or more vertices of the set, vertex shading processing for at least one but not all of the vertex attributes of the vertex or vertices in question, to generate vertex shaded attribute data for those attributes of the vertex or vertices;
(ii) determining, for a vertex or vertices that have been subjected to the first vertex shading operation, whether the vertex or vertices in question should be processed further, using, at least in part, some or all of the vertex shaded attribute data generated by the first vertex shading operation; and
(iii) performing a second vertex shading operation on a vertex or vertices that it has been determined should be processed further, wherein the second vertex shading operation comprises performing vertex shading processing for at least one other vertex attribute of the plurality of vertex attributes belonging to the vertex in question, to generate vertex shaded attribute data for the at least one other attribute of the vertex or vertices;
wherein the first and second vertex shading operations are performed by executing respective vertex shading programs for those operations, and the method further comprises:
generating the vertex shading programs for the first and second vertex shading operations by modifying the vertex shading program supplied by the application that requires the graphics processing in question by:
for the vertex shading program for the first vertex shading operation, removing one or more output attributes from the vertex shading program supplied by the application and recompiling the vertex shading program; and
for the vertex shading program for the second vertex shading operation, removing from the vertex shading program supplied by the application one or more output attributes that will be processed by the first vertex shading program and recompiling the vertex shading program.

2. The method of claim 1, wherein the vertex attributes that are processed by the first vertex shading operation comprise the positional attributes of the vertex or vertices in question.

3. The method of claim 1, wherein:
the graphics processing pipeline is a tile-based graphics processing pipeline in which the render output of the graphics processing pipeline is divided into a plurality of tiles for rendering purposes; and
the step of determining whether the vertex or vertices in question should be processed further comprises determining whether the vertex or vertices in question belong to a primitive that is included in a primitive list for a tile of the render output being processed.

4. The method of claim 1, wherein the second vertex shading operation is implemented using execution threads that execute a sequence of instructions for the second vertex shading operation; and the method comprises creating an execution thread for a vertex for executing the second vertex shading operation when it is determined by the determining step that the vertex in question should be processed further.

5. The method of claim 1, further comprising storing information indicating which vertices have been determined as needing to be processed further.

6. The method of claim 1, further comprising storing information indicating which vertices have been determined as needing to be processed further, wherein the second vertex shading operation is implemented using execution threads that execute a sequence of instructions for the second vertex shading operation;

the method further comprising one of:
only creating threads for execution for the second vertex shading operation for vertices that the information indicating which vertices have been determined as needing to be processed further indicates should be processed further; and
each second vertex shading operation execution thread executing an instruction to access the information indicating which vertices have been determined as needing to be processed further, and conditionally executing the remaining instructions for the second vertex shading operation based on the information indicating which vertices have been determined as needing to be processed further for the vertex in question.

7. The method of claim 1, further comprising determining whether to enable the vertex shading operation of claim 1 for a set of vertices to be processed by the graphics processing pipeline.

8. The method of claim 1, further comprising determining whether to enable the vertex shading operation of claim 1 for a set of vertices to be processed by the graphics processing pipeline, wherein the determination as to whether to enable the vertex shading operation of claim 1 is based on a property or properties:
of a previous render output or outputs of the graphics processing pipeline; and/or
of the current render output of the graphics processing pipeline.

9. A method of operating a tile-based graphics processing pipeline that includes vertex shading circuitry that performs vertex shading operations on vertex attribute data to generate vertex shaded vertex attribute data, and tiling circuitry that sorts primitives to be processed by the graphics processing pipeline into primitive lists for respective tiles that the render target output of the graphics processing pipeline has been divided into for rendering purposes, the method comprising:
when generating a render target to be generated by the graphics processing pipeline:
deferring the vertex shading of at least some of the attributes of the vertices to be processed when generating the render target until after the tiling circuitry has prepared the primitive lists for the tiles that the render target of the graphics processing pipeline has been divided into for rendering purposes by:
performing a first vertex shading operation on the vertices, comprising performing vertex shading processing for at least one but not all of the vertex attributes of the vertices, before the tiling circuitry has prepared the primitive lists for the tiles; and
performing a second vertex shading operation on the vertices, comprising performing vertex shading processing for at least one other vertex attribute belonging to the vertices, after the tiling circuitry has prepared the primitive lists for the tiles;

wherein the first and second vertex shading operations are performed by executing respective vertex shading programs for those operations, and the method further comprises:
generating the vertex shading programs for the first and second vertex shading operations by modifying a vertex shading program supplied by the application that requires the graphics processing in question by:
for the vertex shading program for the first vertex shading operation, removing one or more output attributes from the vertex shading program supplied by the application and recompiling the vertex shading program; and
for the vertex shading program for the second vertex shading operation, removing from the vertex shading program supplied by the application one or more output attributes that will be processed by the first vertex shading program and recompiling the vertex shading program.

10. A graphics processing pipeline comprising:
vertex shading circuitry that performs vertex shading operations on vertex attribute data to generate vertex shaded vertex attribute data; wherein:
the vertex shading circuitry is configured to perform a first vertex shading operation on one or more vertices of a set of vertices to be processed by the graphics processing pipeline, wherein the first vertex shading operation comprises performing, for the one or more vertices of the set, vertex shading processing for at least one but not all of the vertex attributes of the vertex or vertices in question, to generate vertex shaded attribute data for those attributes of the vertex or vertices;
the graphics processing pipeline further comprises determining circuitry that determines, for a vertex or vertices that have been subjected to the first vertex shading operation, whether the vertex or vertices in question should be processed further, using, at least in part, some or all of the vertex shaded attribute data generated by the first vertex shading operation; and
the vertex shading circuitry is configured to perform a second vertex shading operation on a vertex or vertices that it has been determined should be processed further, wherein the second vertex shading operation comprises performing vertex shading processing for at least one other vertex attribute of the plurality of vertex attributes belonging to the vertex in question, to generate vertex shaded attribute data for the at least one other attribute of the vertex or vertices;
wherein the first and second vertex shading operations are performed by executing respective vertex shading programs for those operations, and the vertex shading programs for the first and second vertex shading operations are generated by compiling circuitry that modifies a vertex shading program supplied by the application that requires the graphics processing in question by:
for the vertex shading program for the first vertex shading operation, removing one or more output attributes from the vertex shading program supplied by the application and recompiling the vertex shading program; and
for the vertex shading program for the second vertex shading operation, removing from the vertex shading program supplied by the application one or more output attributes that will be processed by the first vertex shading program and recompiling the vertex shading program.

11. The pipeline of claim 10, wherein the vertex attributes that are processed by the first vertex shading operation comprise the positional attributes of the vertex or vertices in question.

12. The pipeline of claim 10, wherein:
the graphics processing pipeline is a tile-based graphics processing pipeline in which the render output of the graphics processing pipeline is divided into a plurality of tiles for rendering purposes; and
the determining circuitry comprises tiling circuitry that sorts primitives to be processed by the graphics processing pipeline into primitive lists for respective tiles that the render output of the graphics processing pipeline has been divided into for rendering purposes.

13. The pipeline of claim 10, wherein the second vertex shading operation is implemented using execution threads that execute a sequence of instructions for the second vertex shading operation; and the determining circuitry creates an execution thread for a vertex for executing the second vertex shading operation when it determines that the vertex in question should be processed further.

14. The pipeline of claim 10, wherein the determining circuitry stores information indicating which vertices have been determined as needing to be processed further.

15. The pipeline of claim 10, wherein the determining circuitry stores information indicating which vertices have been determined as needing to be processed further, wherein the second vertex shading operation is implemented using execution threads that execute a sequence of instructions for the second vertex shading operation; wherein:
threads for execution for the second vertex shading operation are only created for vertices that the information indicating which vertices have been determined as needing to be processed further indicates should be processed further; or
each second vertex shading operation execution thread executes an instruction to access the information indicating which vertices have been determined as needing to be processed further, and conditionally executes the remaining instructions for the second vertex shading operation based on the information indicating which vertices have been determined as needing to be processed further for the vertex in question.

16. The pipeline of claim 10, further comprising circuitry that determines whether to enable the vertex shading operation of claim 1 for a set of vertices to be processed by the graphics processing pipeline.

17. A tile-based graphics processing pipeline comprising:
vertex shading circuitry that performs vertex shading operations on vertex attribute data to generate vertex shaded vertex attribute data, and tiling circuitry that sorts primitives to be processed by the graphics processing pipeline into primitive lists for respective tiles that the render output of the graphics processing pipeline has been divided into for rendering purposes;
wherein the pipeline is configured to, when generating a render output to be generated by the graphics processing pipeline that requires vertex shading operations:
defer the vertex shading of at least some of the attributes of the vertices to be processed when generating the render output until after the tiling circuitry has prepared the primitive lists for the tiles that the render output has been divided into for rendering purposes by:
performing a first vertex shading operation on the vertices, comprising performing vertex shading processing for at least one but not all of the vertex attributes of the vertices, before the tiling circuitry has prepared the primitive lists for the tiles; and
performing a second vertex shading operation on the vertices, comprising performing vertex shading processing for at least one other vertex attribute of the vertices, after the tiling circuitry has prepared the primitive lists for the tiles;
wherein the first and second vertex shading operations are performed by executing respective vertex shading programs for those operations;
wherein the tile-based graphics processing pipeline further comprises compiling circuitry that generates the vertex shading programs for the first and second vertex shading operations by modifying a vertex shading program supplied by the application that requires the graphics processing in question by:
for the vertex shading program for the first vertex shading operation, removing one or more output attributes from the vertex shading program supplied by the application and recompiling the vertex shading program; and
for the vertex shading program for the second vertex shading operation, removing from the vertex shading program supplied by the application one or more output attributes that will be processed by the first vertex shading program and recompiling the vertex shading program.

18. A non-transitory computer readable storage medium storing computer software code which when executing on at least one processor performs a method of operating a graphics processing pipeline that includes vertex shading circuitry that performs vertex shading operations on vertex attribute data to generate vertex-shaded vertex attribute data, the method comprising:
for a set of vertices to be processed by the graphic processing pipeline:
(i) performing a first vertex shading operation on one or more vertices of the set of vertices, wherein the first vertex shading operation comprises performing, for the one or more vertices of the set, vertex shading processing for at least one but not all of the vertex attributes of the vertex or vertices in question, to generate vertex shaded attribute data for those attributes of the vertex or vertices;
(ii) determining, for a vertex or vertices that have been subjected to the first vertex shading operation, whether the vertex or vertices in question should be processed further, using, at least in part, some or all of the vertex shaded attribute data generated by the first vertex shading operation; and
(iii) performing a second vertex shading operation on a vertex or vertices that it has been determined should be processed further, wherein the second vertex shading operation comprises performing vertex shading processing for at least one other vertex attribute of the plurality of vertex attributes belonging to the vertex in question, to generate vertex shaded attribute data for the at least one other attribute of the vertex or vertices;
wherein the first and second vertex shading operations are performed by executing respective vertex shading programs for those operations, and the method further comprises:
generating the vertex shading programs for the first and second vertex shading operations by modifying a vertex shading program supplied by the application that requires the graphics processing in question by:
for the vertex shading program for the first vertex shading operation, removing one or more output attributes from the vertex shading program supplied by the application and recompiling the vertex shading program; and for the vertex shading program for the second vertex shading operation, removing from the vertex shading program supplied by the application one or more output attributes that will be processed by the first vertex shading program and recompiling the vertex shading program.

\* \* \* \* \*